United States Patent [19]
Sakashita et al.

[11] Patent Number: 5,663,603
[45] Date of Patent: Sep. 2, 1997

[54] ROTARY ELEMENT DRIVING DEVICE

[75] Inventors: Hiroshi Sakashita; Eiji Arasaki, both of Nagano, Japan

[73] Assignee: Kabushiki Kaisha Sankyo Seiki Seisakusho, Nagano, Japan

[21] Appl. No.: 569,882

[22] Filed: Dec. 8, 1995

[30] Foreign Application Priority Data

Dec. 8, 1994 [JP] Japan ................... 6-304588
Aug. 2, 1995 [JP] Japan ................... 7-197220

[51] Int. Cl.$^6$ .................................................... H02K 5/00
[52] U.S. Cl. ........................ 310/91; 310/67 R; 360/97.01
[58] Field of Search .................................. 310/91, 67 R, 310/217, DIG. 6; 360/132, 99.08, 99.04, 126, 120

[56] References Cited

U.S. PATENT DOCUMENTS

| | | | |
|---|---|---|---|
| 4,855,849 | 8/1989 | Jones et al. .................... | 360/97.01 |
| 5,008,573 | 4/1991 | Beppu et al. .................. | 310/67 R |
| 5,025,336 | 6/1991 | Morehouse et al. ........... | 360/97.02 |
| 5,311,383 | 5/1994 | Yokouchi ...................... | 360/99.08 |
| 5,316,831 | 5/1994 | Nakajima et al. ............. | 428/209 |
| 5,319,270 | 6/1994 | Tanaka et al. ................. | 310/67 R |
| 5,469,421 | 11/1995 | Aruga et al. .................. | 369/75.1 |

Primary Examiner—Clayton E. LaBalle
Assistant Examiner—Timothy A. Williams
Attorney, Agent, or Firm—Sughrue, Mion, Zinn, Macpeak & Seas

[57] ABSTRACT

A disk drive device includes a device stand on which a spindle motor and a device control board are fixedly mounted. The device stand has a motor mounting section which is embossed so that the spindle motor is mounted on the motor mounting section. Fastening members are inserted into the mounting holes which are formed in a stator core and the motor mounting section in such a manner that they are aligned with one another so that, with the fastening members, the circuit board is held between the motor mounting section and the stator core, and the spindle motor is fixedly mounted on the device stand. The circuit board follows the surface of the motor mounting surface being held in close contact with the latter.

15 Claims, 4 Drawing Sheets

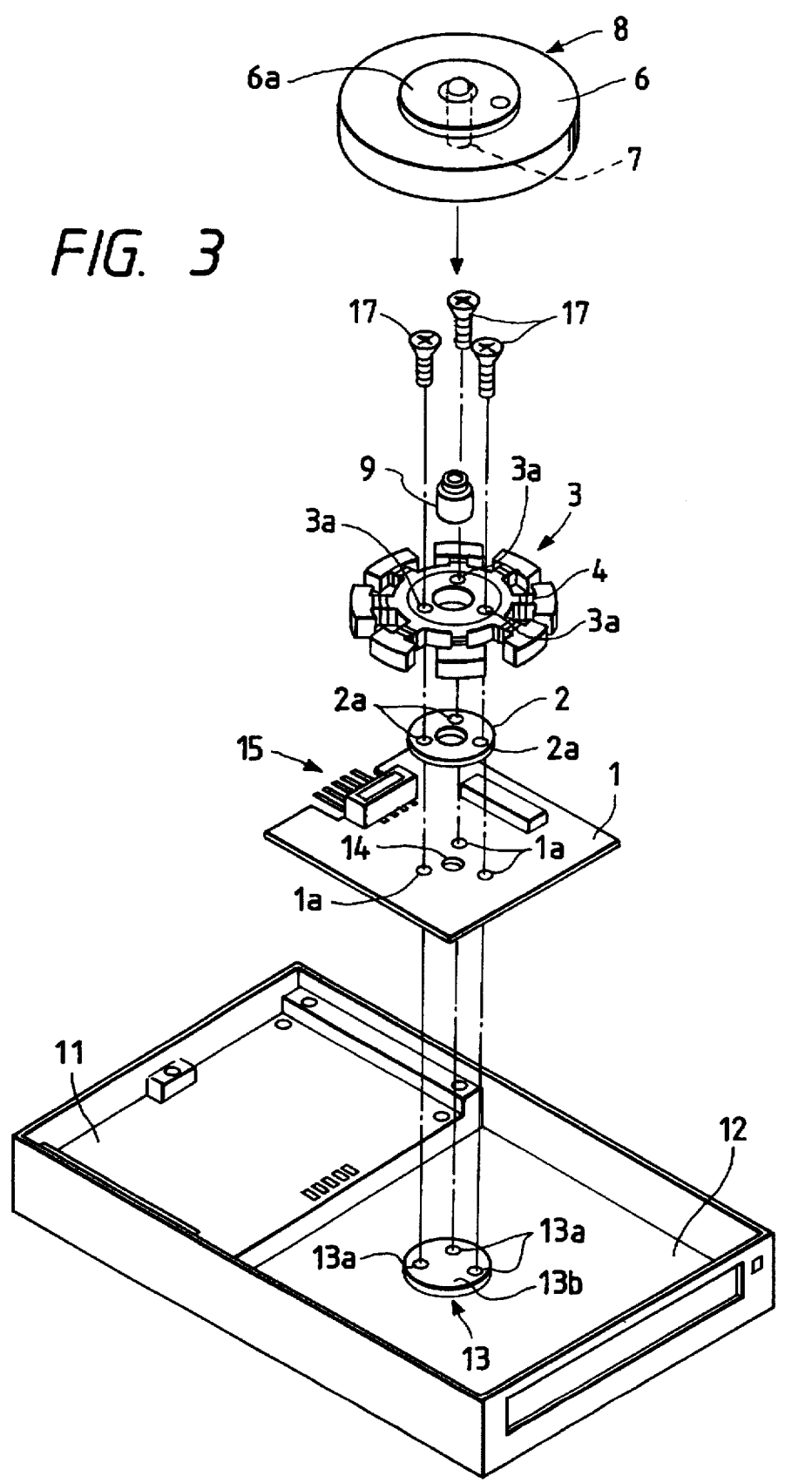

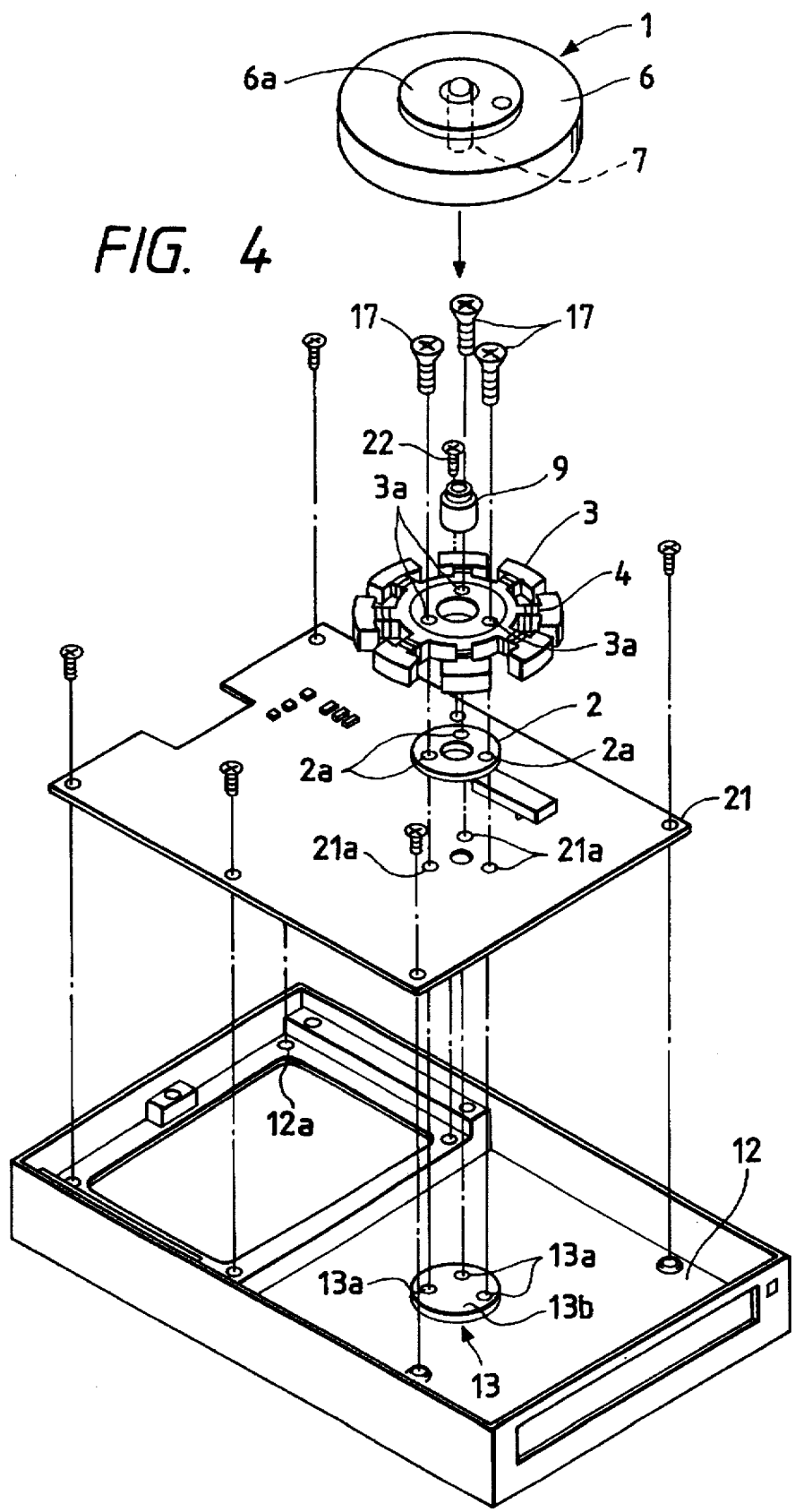

ROTARY ELEMENT DRIVING DEVICE

BACKGROUND OF THE INVENTION

1. Field of the Invention

This invention relates to a rotary element driving device for rotating a rotary element such as a 3.5" floppy disk, optical disk, or polygon mirror.

2. Description of the Related Art

A rotary element driving device of this type (fur rotating a rotary element such as a 3.5" floppy disk, optical disk, or polygon mirror) is known in the art. The device has a spindle motor to rotate a rotary element such as a floppy disk, optical disk or polygon mirror.

In installing the spindle motor in the rotary element driving device—for instance in assembling a disk drive device for rotating a 3.5" floppy disk, the necessary components are not directly set in the disk drive device to form the spindle motor. Rather, the following method is employed: As shown in FIG. 5, a spindle motor 35 is formed separately from a disk drive device stand 37, and the former 35 is mounted on the latter 37. This is because, in general, a manufacturer forming the motor is different from a manufacturer who forms the disk drive device.

The spindle motor 35, which is formed separately from the disk drive device stand 37, generally comprises: a rotor casing 33; a hub stand 36 which is formed embossed together with the rotor casing 33 so that a floppy disk (or magnetic disk) is mounted on it; a stator (not shown) built in the rotor casing 33; and a motor driving circuit board 31 provided integral with the stator. The circuit board 31 has mounting holes 31a which are used to mount the spindle motor 35 on the disk drive device. With the mounting holes 31a aligned with mounting holes (not shown) formed in the disk drive device stand 37, screws 32 are threadably inserted into those mounting holes to fixedly mount the spindle motor 35 on the disk drive device.

The circuit board 31 of the spindle motor is liable to warp because it is made of a thin-plate-shaped material. If, with the circuit board 31 warped, the spindle motor 35 is mounted on the device stand 37, then the hub stand 36, on which a disk is mounted, is unstable in height; i.e., the spindle-motor mounting surface of the device stand 37 and the disk placing surface 36a of the hub stand 36 are lowered in the degree of parallelization. Accordingly, the recording and reproducing head adapted, for instance, to read data from the disk, and the disk placed on the hub stand 36 are lowered in positional accuracy, as a result of which errors are liable to occur during data reading or writing operations.

The same thing may be said about the case where, instead of the disk, a polygon mirror is employed. If, with the circuit board 31 held warped, the spindle motor 35 with the rotary element, namely, the polygon mirror is mounted on the drive device stand 37, then the polygon mirror is changed in height, or inclined, as a result of which it is impossible to move the laser beam along the predetermined optical path. Thus, the rotary-element driving device is insufficient in accuracy.

SUMMARY OF THE INVENTION

Accordingly, an object of the invention is to eliminate the above-described difficulties accompanying a conventional rotary-element driving device. More specifically, an object of the invention is to provide a rotary-element driving device in which the spindle motor is mounted on the device stand without being affected by the bend or warp of the motor driving circuit board, and in which the rotary element coupled to the motor, and the rotary-element driving mounting-surface (or hub stand) are accurate in flatness.

There is provided a rotary element driving device which includes a spindle motor having; motor driving circuit board for driving said motor, a stator core of said motor which is fixedly mounted on said circuit board, a coil assembly wound on salient poles of said stator core, a rotor including a drive magnet confronted with said stator core, a rotary element placing section, a shaft, and a bearing which rotatably supports said shaft; and a device stand on which said spindle motor is fixedly mounted, wherein said device stand has a motor mounting section which is embossed to have a motor mounting reference flat surface, fastening members are inserted into mounting holes which are formed in said stator core and said motor mounting section in such a manner that said mounting holes are aligned with one another, and with said fastening members, said stator core is fixedly mounted on said embossed motor mounting section, and said motor driving circuit board is held between said stator core and said motor mounting section in such a manner that said motor driving circuit board is in close contact with said motor mounting reference flat surface, whereby said spindle motor is fixedly mounted on said device stand.

In the rotary element driving device of the invention, the device stand has the motor mounting section which is embossed to have the motor mounting reference flat surface, and the spindle motor is mounted on the motor mounting reference flat surface of the motor mounting section, and the fastening members are inserted into the mounting holes which are formed in the stator core and the motor mounting section in such a manner that they are aligned with and communicated with one another, and, with the fastening members, the circuit board is held between the motor mounting section and the stator core. Hence, the motor driving circuit board being held in close contact with the motor mounting reference flat surface, the warp or bend of the circuit board is corrected, which improves the degree of parallelization of the rotary element placed on the spindle motor.

In the case where the technical concept of the invention is applied to a disk drive device, not only the height of the hub stand surface which is the disk placing surface with respect to the end face of the motor mounting section, but also the degree of parallelization of the former with respect to the latter is improved. This means that the data recording and reproducing head and the disk are improved in positional accuracy, which eliminates the occurrence of access errors in the date reading or writing operation.

BRIEF DESCRIPTION OF THE DRAWING(S)

FIG. 3 is an exploded perspective view of the embodiment of the invention shown in FIG. 2.

FIG. 4 is an exploded perspective view showing another embodiment of the invention.

DETAILED DESCRIPTION OF PREFERRED EMBODIMENTS

Preferred embodiments of the invention will be described with reference to the accompanying drawings.

Figure 1:
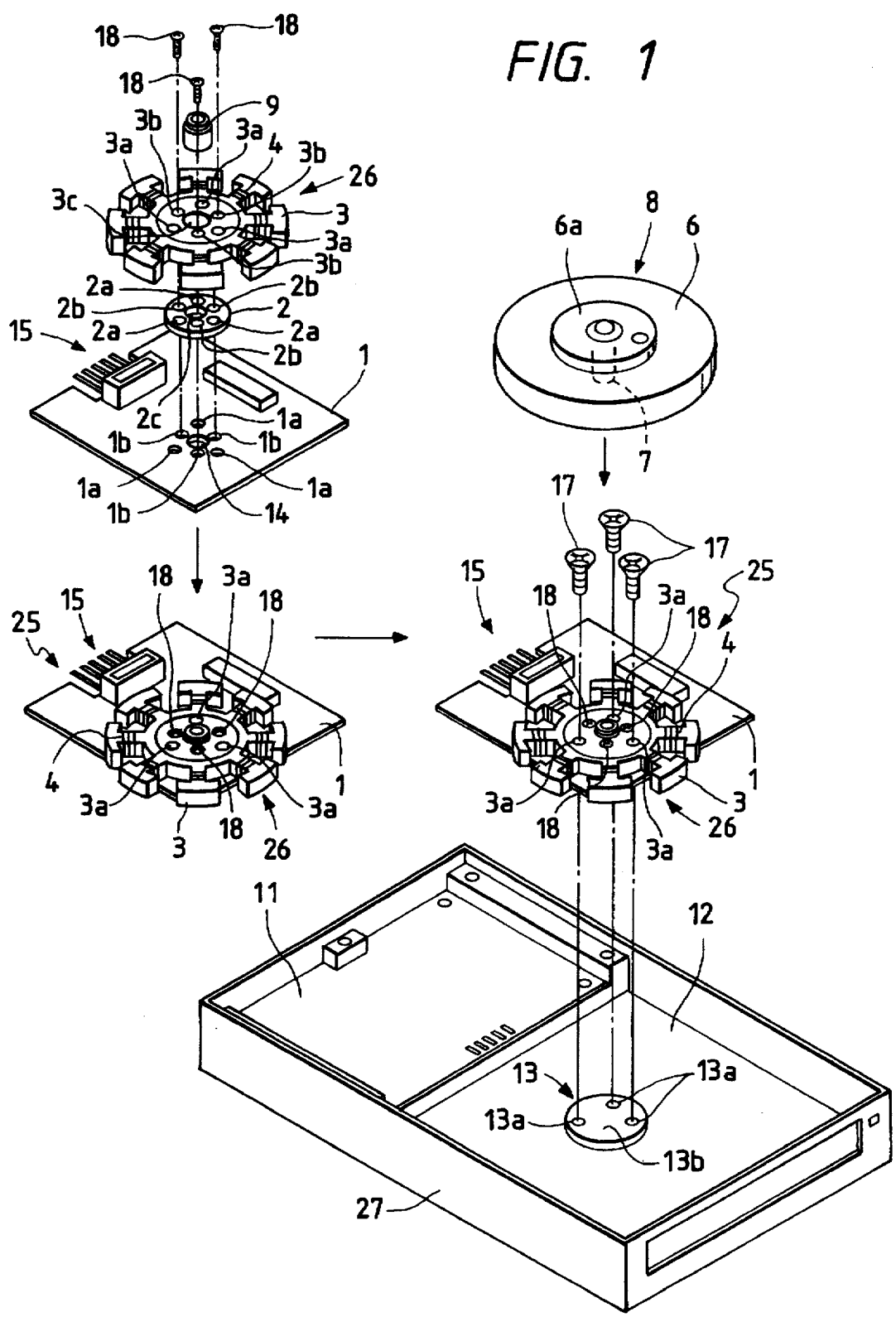
FIG. 1 is an exploded perspective view showing a disk drive device, a typical example of a rotary element driving device, which constitutes an embodiment of the invention.

FIG. 1 shows a disk drive device, an example of a rotary-element driving device, which constitutes a first embodiment of the invention. In the first embodiment as shown in FIG. 1, a motor-driving circuit board 1 is rectangular, and is formed as follows: The surface of a metal plate is covered with an insulating layer, and a predetermined circuit pattern is formed on the insulting layer. One end of the circuit pattern is connected to a coupling terminal 15. A thrust bearing 14 is mounted on the circuit board 1. Three mounting holes 1a, and another three mounting holes 1b are arranged around the thrust bearing 14.

A substantially regular triangle is formed with lines which connect the centers of the three mounting holes 1a, and the thrust bearing 14 is located at the center of the substantially regular triangle thus formed. The other three mounting holes 1b are each located between two adjacent ones of the mounting holes 1a positioned at the vertexes of the substantially rectangle.

A spacer 2 is provided on the circuit board 1. The spacer 2 is like a disk, and has a central hole 2c, and three mounting holes 2a and another three mounting holes 2b. The positions of the mounting holes 2a correspond to those of the mounting holes 1a of the circuit board 1, and the positions of the mounting holes 2b also correspond to those of the mounting holes 1b of the circuit board 1. Hence, when the spacer 2 is mounted on the circuit board 1, the thrust bearing 14 is fitted in the central hole 2c of the spacer 2, and at the same time the mounting holes 2a of the spacer 2 meet the mounting holes 1a of the circuit board 1, while the mounting holes 2b meet the mounting holes 1b, respectively.

A stator 26 is mounted on the upper end face of the spacer 2 which has been mounted on the circuit board 1. The stator 26 comprises a starer core 3, and a drive coil assembly 4. The stator core 3 is formed annular by stacking a plurality of salient magnetic plates, and has a plurality of poles extending radially outwardly from the outer periphery. The drive coil assembly 4 is wound on the sealant poles of the starer core 3. The starer core 3 has a central hole 3c in correspondence to the central hole 2c of the spacer 2. A bearing 9 of sintered material is fixedly press-fitted in the central hole 3c of the stator core 3. The stator core 3 has a group of three mounting holes 3a and another group of three mounting holes 3b around the central hole 3c. The positions of the mounting holes 3a correspond to those of the mounting holes 2a of the spacer 2, and the positions of the mounting holes 3b correspond to those of the mounting holes 2b, respectively.

The mounting holes 1a of the circuit board 1, the mounting holes 2a of the spacer 2, and the mounting holes 3a of the stator core 3 are used to mount the spindle motor 25 on a motor mounting section 13. The circuit board 1, the spacer 2, and the stator 26 ere stacked in such a manner that those mounting holes are vertically aligned with and communicated with one another. When they are stacked in the above-described manner, the other mounting holes 1b, 2b and 3b, which are used to mount the stator 26 on the circuit board 1, are also vertically aligned with and communicated with one another. Screws 18 are inserted into the mounting holes 1b, 2b and 3b thus aligned from the side of the stator 26, and their end portions are threadably engaged with the mounting holes 1b of the circuit board 1, so that the spacer 2 and the stator 26 are fixedly mounted on the circuit board 1. Under this condition, the spindle motor 25 formed so far on the circuit board 1 has no rotor yet; that is, it has been semi-assembled; however, the spindle motor 25 is mounted on the disk drive device.

On the other hand, the disk drive device comprises; a housing 27; a device stand 12 provided in the housing; and a device control board 11 mounted on the device stand 12. Disk drive device controlling components are sat on the device control board 11. The device stand 12 includes a motor mounting section 13 which is embossed so that spindle motor 25 is to be mounted thereon. More specifically, the motor mounting section 13 has an upper end face 13b, namely, a motor mounting reference flat surface which is in parallel with the flat surface of the device stand 12. The upper end face 13b of the motor mounting section 13, the motor mounting reference flat surface, is smaller in area than the circuit board 1 on which the spindle motor 25 is mounted; more specifically, it is substantially equal in area to the end face of the spacer 2. The motor mounting section 13 has three mounting holes 13a, 13a and 13a in correspondence to the mounting holes 1a, 1a and 1a of the circuit board 1 of the spindle motor 25.

Figure 2:
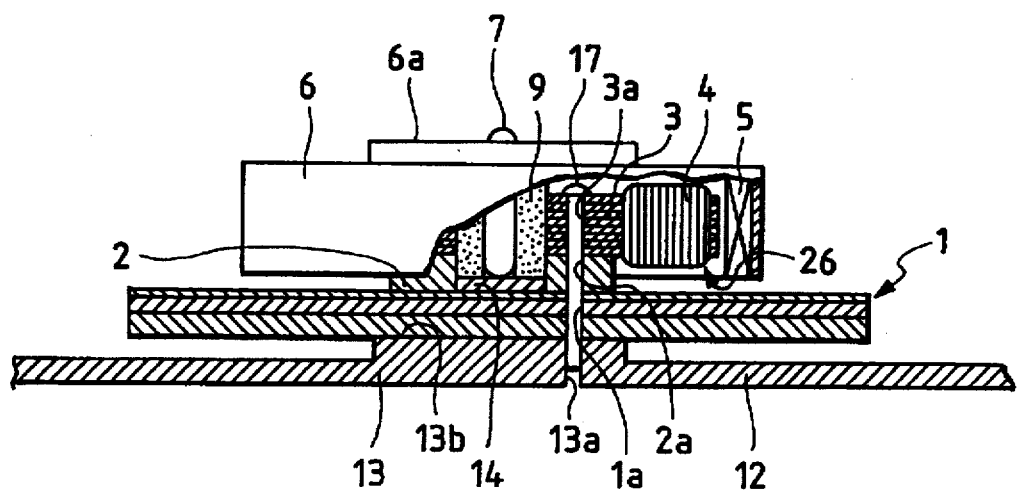
FIG. 2 is an enlarged sectional view showing another embodiment of the invention.
Figure 5:
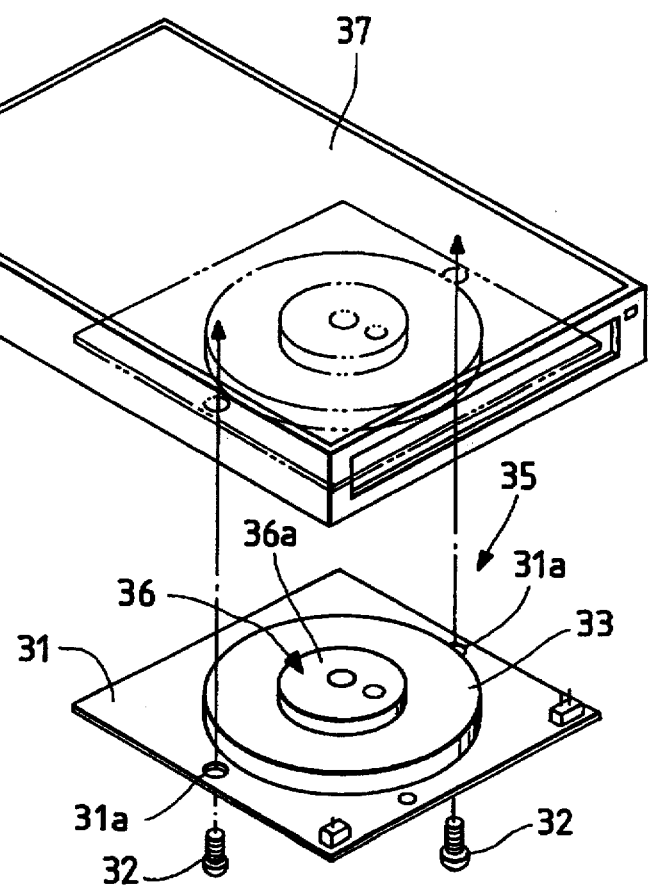
FIG. 5 is an exploded perspective view showing a conventional disk drive device.

On the upper end face 13b of the motor mounting section 13 of the device stand 12 constructed in the above-described manner, the circuit board 1 is set on which the semi-assembled spindle motor 25 has been mounted. In this operation, the mounting holes 1a of the circuit board 1, the mounting holes 2a of the spacer 2, the mounting holes 3a of the stator 26, and the mounting holes 13a of the motor mounting section 13 are vertically aligned with one another, thus providing three holes each made up of one mounting hole 1a, one mounting hole 2a, one mounting hole 3a, and one mounting hole 13a. Screws 17 are inserted into those three holes from the side of the stator 26. When the end portions of the screws 17 are threadably engaged with the mounting holes 13a, then as shown in FIG. 2 the central portion of the circuit board 1 is held through the spacer 2 between the motor mounting section 13a and the stator core 3, thus being set in close contact with the flat surface of the upper end face 13b of the motor mounting 13. That is, the semi-assembled spindle motor 25 (having no rotor yet) is fixedly mounted on the device stand 12.

The aforementioned rotor 8 is coupled to the semi-assembled spindle motor 25 fixedly mounted on the device stand 12. The rotor 8 comprises: a shaft 7; a cup-shaped rotor casing 6 which is fixedly fitted on the end of the shaft 7; a hub stand 6a set on the upper surface of the rotor casing 6 so that a disk may be placed on it; and a drive magnet assembly mounted on the inner cylindrical surface of the outer cylindrical wall of the rotor casing 6. In the above-described embodiment, the hub stand 6a is an individual component which is mounted on the rotor casing 6; however, the hub stand 6a maybe formed by embossing the central portion of the upper surface to the rotor casing 6. Alternatively, a sheet may be bonded to the surface of a disk chucking magnet set on the casing. The shaft 7 is fitted in the central hole of a bearing 9, and its lower end is abutted against the aforementioned thrust bearing 14; that is, the shaft 7 is rotatably supported with respect to the stator 26. As was described above, the drive magnet assembly mounted on the inner cylindrical surface of the rotor casing 6 is confronted through a predetermined gap with the saliant poles of the stator core 3. Hence, by application of current to the drive coil assembly 4 wound on the saliant poles of the stator core 3, the drive coil assembly 4 is energized, so that the rotor casing 6 is turned, and accordingly the hub stand 6a bearing the disk is rotated.

In the disk drive device thus constructed, the motor mounting section 13 is formed by embossing the device stand 12 on which the spindle motor 25 is to be mounted. With the lower surface of the circuit board 1 of the spindle motor 25 abutted against the upper end face 13b of the motor mounting section 13, the end portions of the screws 17 are inserted into stator 26, the spacer 2, and the circuit board 1, and then screwed into the mounting holes 13a of the motor mounting section 13, so that, while the circuit board 1 is being held with the stator 26 and the motor mounting section 13, the spindle motor 25 is fixedly mounted on the device stand 12. As was described above, the spindle motor 25 is fixedly secured with the screws 17 threadably engaging with the mounting hole 13a of the motor mounting section 13. Hence, the circuit board 1 is held in close contact with the upper surface 13b of the motor mounting section 13, thus following the upper surface 13b. As a result, the bend or warp of the circuit board 1 is corrected by the motor mounting section 13. On the other hand, the upper surface 13b of the motor mounting section 13 is in parallel with the flat surface of the device stand 12, and therefore the hub stand 6a on the spindle motor 25 is in parallel with the flat surface of the device stand. That is, the hub stand 6a is constant in height all around it, and the degree of parallelization of the disk mounting surface of the hub stand 6a with respect to the upper end face of the motor mounting section 13 is greatly improved. In addition, the head and the disk are improved in positional accuracy, which effectively eliminates the occurrence of errors in the data reading or writing operations.

The motor mounting section 13 should be large enough for the installation of the spindle motor 25. In the embodiment, the motor mounting section 13 is circular; however, the invention is not limited thereto or thereby. For instance, it may be replaced with three protrusions. The motor mounting section 13 may be larger in area than the end face of the spacer 2. The configuration of the motor mounting section 13 is not particularly limited; however, in order to employ the upper end face of the motor mounting section 13 as the motor mounting reference surface, it should provide a flat surface which is in parallel with the device stand 12. In this connection, what is required is that the upper end face of the motor mounting section 13 is in parallel with the disk placing surface 6a, of the spindle motor 25; and it is not always necessary that it is in parallel with the device stand 12.

In the above-described embodiment, the stator 26 is fixedly mounted on the circuit board 1 with the screws 18, while the spindle motor 25 is mounted on the motor mounting section 13 with the screws 17; that is, those screws 17 and 18 are different. In this connection, the device may be modified as shown in FIGS. 2 and 3. That is, the stator core 3 has only the first group of mounting holes 3a, and only three screws 17 are used to secure the stator 26 to the circuit board 1 and at the same time to fixedly mount the spindle motor 25 on the motor mounting section.

In this case, the screws 17 are inserted into them from the side of the stator core 3; more specifically, they are inserted into the mounting holes 3a of the stator core 3, the mounting holes 2a of the spacer 2, and the mounting holes 1a of the circuit board 1, and then threadably engaged with the mounting holes 13a of the motor mounting section 13, so that the stator 26 is secured to the circuit board 1, and at the same time the spindle motor 25 (made up of the stator 26 and the circuit board 1) is fixedly mounted on the device stand 12. Hence, the device has not only the above-described effects, but also an effect that it is improved in manufacturing efficiency. In addition, it is unnecessary to prepare the screws for fixing the stator 26 to the circuit board 1 and accordingly to have the corresponding mounting holes. This feature reduces the manufacturing cost as much. On the other hand, needless to say, the number of screws is not limited only to three.

In the disk drive devices shown in FIGS. 1 through 3, the circuit board 1, on which the spindle motor 25 is formed, is a component separate from the device control board 11; however, the invention is not limited thereto or thereby. That is, the disk drive device may be modified as shown in FIG. 4. In the device of FIG. 4, the circuit board and the device control board are provided as one unit, namely, a control circuit board 21, and the spindle motor 25 and the controlling components are mounted on the control circuit board 21. That is, the provision of the circuit board and the device control board as one unit, namely, the control circuit board 21, further improves the productivity of the disk drive device.

The disk drive device using the control circuit board 21 which is the combination of the circuit board and the device control board, is assembled as follows: In mounting the spindle motor 25 on the circuit board, the screws 17 are inserted into the mounting holes 3a of the stator core 3, the mounting holes 2a of the spacer 2, and the mounting holes of the control circuit board 21, and are then threadably engaged with the mounting holes 13a of the motor mounting section 13. As a result, the control circuit board 21 is held by the motor mounting section 13, the stator core 3, and the spacer 2, while being in close contact with the upper end face 13b of the motor mounting section 13. Hence, the part of the control circuit board 21 on which the motor is formed is caused to follow the upper end face 12b of the motor mounting section 13, so that its bend or warp is corrected. Hence, the degree of parallelization of the disk placing surface of the hub stand 6a with respect to the motor mounting section 13 is improved; that is, the head and the disk are improved in positional accuracy, which eliminates the occurrence of errors in the data reading or writing operation.

In the above-described embodiments, the spindle motor has the hub stand with the disk placing surface; however, the invention is not limited thereto or thereby. That is, the technical concept of the invention may be applied to spindle motors for rotating other type disks, or a spindle motor having a polygon mirror instead of the hub stand, or spindle motors having other rotary elements.

In the rotary element driving device of the invention, the device stand has the motor mounting section which is embossed to have the motor mounting reference flat surface, and the spindle motor is mounted on the motor mounting reference flat surface of the motor mounting section, and the fastening members are inserted into the mounting holes which are formed in the stator core and the motor mounting section in such a manner that they are aligned with and communicated with one another, and, with the fastening members, the circuit board is held between the motor mounting section and the stator core. Hence, the motor driving circuit board being held in close contact with the motor mounting reference flat surface, the warp or bend of the circuit board is corrected, which improves the degree of parallelization of the rotary element placed on the spindle motor.

In the case where the technical concept of the invention is applied to a disk drive device, not only the height of the hub stand surface which is the disk placing surface with respect to the end face of the motor mounting section, but also the degree of parallelization of the former with respect to the latter is improved. This means that the data recording and reproducing head and the disk are improved in positional accuracy, which eliminates the occurrence of access errors in the data reading or writing operation.

What is claimed is:

1. A rotary element driving device comprising:
   a spindle motor including:
   a motor driving circuit board for driving said motor;
   a stator core of said motor which is fixedly mounted on said circuit board;
   a coil wound on the salient poles of said stator core;
   a rotor including a drive magnet confronted with said stator core, a rotary element placing section, and a shaft;
   a bearing which rotatably supports said shaft; and
   a device stand on which said spindle motor is fixedly mounted,
   wherein said device stand has a motor mounting section which is embossed to have a motor mounting reference flat surface, fastening members are inserted into mounting holes which are formed in said stator core and said motor mounting section in such a manner that said mounting holes are aligned with one another, and with said fastening members, said stator core is fixedly mounted on said motor mounting section, and said motor driving circuit board is held between said stator core and said motor mounting section in such a manner that said motor driving circuit board is in close contact with said motor mounting reference flat surface, whereby said spindle motor is fixedly mounted on said device stand.

2. A rotary element driving device as claimed in claim 1, wherein said motor mounting reference flat surface is parallel with a flat surface of said device stand, and by fixedly mounting said starer core on said motor mounting section with said fastening members, said rotary element placing section is made parallel with said flat surface of said device stand.

3. A rotary element driving device as claimed in claim 2, further comprising:
   a device control board on which circuit components adapted to control said rotary element rotated by said spindle motor are mounted, said device control board being fixedly secured to said device stand.

4. A rotary element driving device comprising:
   spindle motor which including:
   a motor driving circuit board for driving said motor,
   a stator core of said motor which is fixedly mounted on said circuit board,
   a coil wound on the salient poles of said stator core,
   a rotor including a drive magnet confronted with said stator core, a disk placing hub stand, and a shaft;
   a bearing which rotatably supports said shaft; and
   a device stand on which said spindle motor is fixedly mounted,
   wherein said device stand has a motor mounting section which is embossed to have a motor mounting reference flat surface, fastening members are inserted into mounting holes which are formed in said stator core and said motor mounting section in such a manner that said mounting holes are aligned with one another, and with said fastening members, said stator core is fixedly mounted on said motor mounting section, and said motor driving circuit board is held between said stator core and said motor mounting reference flat surface of said motor mounting section on such a manner that said motor driving circuit board is in close contact with said motor mounting reference flat surface, whereby said spindle motor is fixedly mounted on said device stand.

5. A rotary element driving device as claimed in claim 4, wherein said motor mounting reference flat surface is parallel with a flat surface of said device stand, and by fixedly mounting said stator core on said motor mounting section with said fastening member, said disk placing hub stand is made parallel with said flat surface of said device stand.

6. A rotary element driving device as claimed in claim 5, further comprising:
   a device control board on which circuit components adapted to control a disk drive device which is driven by said spindle motor to turn said disk are mounted;
   said device control board being fixedly secured to said device stand separately from said motor driving circuit board.

7. A rotary element driving device as claimed in claim 6, further comprising:
   a device control board on which circuit components adapted to control a disk drive device which is driven by said spindle motor to turn said disk are mounted,
   wherein said motor driving circuit board and said device control board for controlling said disk drive device are provided as one unit.

8. A rotary element driving device as claimed in claim 2, wherein said stator core is fixedly mounted through a spacer on said motor driving circuit board, and said fastening members fixedly fasten said mounting section, said motor driving circuit board, said spacer, and said stator core together.

9. A rotary element driving device as claimed in claim 5, wherein said stator core is fixedly mounted through a spacer on said motor driving circuit board, and said fastening members fixedly fasten said mounting section, said motor driving circuit board, said spacer, and said stator core together.

10. A rotary element driving device as claimed in claim 2, wherein said bearing which rotatably supports said rotor is on said motor driving circuit board, and in a central hole of said stator core.

11. A rotary element driving device as claimed in claim 5, wherein said bearing which rotatably supports said rotor is on said motor driving circuit board, and in a central hole of said stator core.

12. A rotary element driving device as claimed in claim 8, wherein said motor mounting section has a circular upper end face, and said fastening members comprise three screws.

13. A rotary element driving device as claimed in claim 9, wherein said motor mounting section has a circular upper end face, and said fastening members comprise three screws.

14. A rotary element driving device as claimed in claim 2, said motor driving circuit board comprisess a metal plate having a surface that is covered with an insulating layer; and a predetermined circuit pattern formed on the surface of said metal plate thus covered.

15. A rotary element driving device as claimed in claim 5, said motor driving circuit board comprises: a metal plate having a surface that is covered with an insulating layer; and a predetermined circuit pattern formed on the surface of said metal plate thus covered.

* * * * *